United States Patent [19]

Kramer

[11] 3,746,994

[45] July 17, 1973

[54] APPARATUS FOR DETERMINING THE VALIDITY OF DATA RECEIVED BY DATA

[75] Inventor: Melvin G. Kramer, Riverton, Wyo.

[73] Assignee: Datel Corporation, McLean, Va.

[22] Filed: Mar. 11, 1971

[21] Appl. No.: 123,308

[52] U.S. Cl. .................................. 325/320, 178/88

[51] Int. Cl. .......................................... H04b 1/16

[58] Field of Search .................... 325/320, 322, 323, 325/346, 348, 378; 178/88

[56] References Cited

UNITED STATES PATENTS

| | | | |
|---|---|---|---|
| 3,440,540 | 4/1969 | Hane | 325/346 X |
| 3,457,512 | 7/1969 | Deman | 325/348 X |

*Primary Examiner*—Richard Murray
*Assistant Examiner*—Fay I. Konzem
*Attorney*—Reilly & Lewis

[57] ABSTRACT

A data transmission apparatus has modulating and demodulating circuitry for transmitting data between transmission lines and data terminals. The demodulating circuitry includes a phase lock discriminator loop which converts logic signals of first and second discrete frequencies into DC logic signals. The phase lock discriminator loop includes a voltage controlled oscillator (VCO) and is operable to lock on and track a single frequency signal. The VCO is operable when the loop is locked on to an incoming frequency, such as one or the other of the logic signals at discrete frequencies, to generate an output at the incoming frequency with a phase displacement of 90°. A phase shift circuit receives the VCO output and phase shifts the output 90° into phase with the incoming discrete frequency. A carrier detector senses the electrical signals transmitted to the discriminator loop and ANDS the phase shifted VCO output with the electrical signals transmitted to the discriminator loop. Thereby, pulses are generated which are a measure of the validity of received data since the 90° phase relationship between the VCO output and the incoming signal degenerates if the incoming signal is noise or currupted with noise. A pulse averaging circuit generates an enabling signal to indicate valid data when the pulse average as a function of time exceeds a minimum level. In another embodiment the carrier detector is enabled in order to permit the generation of the enabling signal.

8 Claims, 3 Drawing Figures

INVENTOR
MELVIN G. KRAMER
BY Kelly and Lewis
ATTORNEYS

APPARATUS FOR DETERMINING THE VALIDITY OF DATA RECEIVED BY DATA

The present invention relates to data transmission apparatus of the type adaptable for use as interfacing equipment between telephone lines and data input/output terminal devices. More particularly, the present invention relates to improved circuitry suitable for incorporation into such data transmission apparatus which circuitry is capable of checking the validity of data received by the transmission apparatus and generating an enabling signal whenever valid data is received.

One such data transmission apparatus is described in U.S. Pat. application for Data Transmission Apparatus, Ser. No. 24,555, filed Apr. 1, 1970, which is assigned to the assignee of the present invention. In that apparatus, demodulating circuitry including a phase lock discriminator loop is provided to convert first frequency modulated signals received from telephone lines into first DC logic signals for transmission to a data terminal. Modulating circuitry is also provided to convert second DC logic signals from a data terminal into second frequency modulated signals for transmission to telephone lines.

The first frequency modulated signals received from the telephone lines generally are in the form of two discrete frequencies, such as 2,025 and 2,225 herz, which frequencies represent space and mark. In the demodulating circuitry, the signals received from the telephone lines are filtered by high and low pass filters so that only a predetermined bandwidth of frequencies, such as 2,000 to 2,250 herz, is transmitted to the phase lock discriminator loop. The discriminator loop includes a phase comparator, a low pass filter and a voltage controlled oscillator and operates as a frequency discriminator to convert the first FM logic signals into DC logic signals for transmission to the data terminal. In order to determine whether valid data is being received from the telephone lines and transmitted to the discriminator loop, a carrier detector is connected to sense electrical signals transmitted to the discriminator loop. The carrier detector operates to sense the level of electrical energy transmittted to the discriminator loop and functions in the presence of a minimum level of electrical energy to generate an enabling signal to enable the data transmission apparatus.

Certain limitations are inherent in such a manner of checking the validity of data. First, even in the presence of valid data, the carrier detector does not generate a signal to enable the data transmission apparatus unless the FM logic signals representing the valid data and transmitted to the discriminator loop are of a predetermined minimum level or strength. Thus, the data transmission apparatus is not capable of handling valid data signals which are of extremely weak strength. Secondly, noise signals received from the telephone lines or generated in the circuitry of the transmission apparatus which are of a variable frequency within the bandwidth transmitted to the discriminator loop cause the carrier detector to generate a false enabling signal if these variable frequency signals exceed the predetermined minimum energy level. For example, noise within the 2,000–2,250 herz bandwidth transmitted to the discriminator loop would cause the carrier detector to generate a false enabling signal, if the noise signal exceeded the minimum energy level, and consequently would cause the transmission apparatus to output false data. One way to minimize the transmission of false data is by increasing the predetermined minimum energy level to be exceeded so that noise or error signals would have to be extremely strong in order to exceed this minimum energy level. On the other hand, by increasing this minimum energy level the transmission apparatus becomes even less sensitive to low strength valid data signals.

It is accordingly an object of the present invention to provide a novel circuit arrangement capable of determining the validity of data in the form of discrete frequencies received by data transmission apparatus and generating an enabling signal in response to valid data for enabling the data transmission apparatus which circuitry obviates the aforementioned disadvantages inherent in prior arrangements for checking the validity of such data by being operable to sense low strength valid data signals while ignoring spurious error signals.

It is further an object of the present invention to provide data transmission apparatus of the type adaptable for use as interfacing equipment between telephone lines and data terminals characterized by having a novel circuit arrangement for determining the validity of data in the form of discrete frequencies.

In accomplishing these and other objects, there is provided in accordance with the present invention data transmission apparatus of the type set forth and described in the aforementioned U. S. patent application Ser. No. 24,555. The data transmission apparatus has demodulating circuitry for converting FM logic signals of first and second discrete frequencies which are received on telephone lines into DC logic signals for transmission to a data input terminal. The demodulating circuitry includes a phase lock discriminator loop having a voltage controlled oscillator (VCO) in the loop which is driven by the loop output to frequency lock on a received FM logic signal with a phase displacement of 90° whereby the FM logic signals are demodulated and converted into DC logic signals. As before-mentioned, high and low pass filters are included in the demodulating circuitry to limit the transmission of electrical signals from the telephone lines to the phase lock discriminator loop to a narrow bandwidth of frequencies which includes the FM logic signals of the first and second discrete frequencies.

To check the validity of data transmitted to the phase lock discriminator loop, a novel circuit arrangement is provided in the data transmission apparatus. Before considering the operation of this circuit arrangement, a certain characteristic of a valid FM logic signal should be considered: This characteristic is that a valid FM logic signal is at a single discrete frequency. Thus, a predetermined 90° phase difference exists between the signals at each of the discrete frequencies and the VCO output frequency when the VCO is phase locked on an incoming FM logic signal. For example, if the first and second discrete frequencies are 2,025 and 2,225 herz, the phase difference between a signal at each of these frequencies and the VCO output frequency when the phase lock discriminator loop is tracking either of these incoming logic signals is 90°.

The novel circuit arrangement in the data transmission apparatus utilizes the above-mentioned characteristic of valid FM logic signals to determine the validity of data being transmitted to the phase lock discriminator loop. Included in the circuit arrangement is a phase shifting circuit which is operable to phase shift the output of the VCO 90°, i.e. the amount equal to the phase displacement between an incoming single frequency logic signal and the VCO output when tracking the incoming logic signal. The VCO output is phase shifted 90° so that whenever the VCO is phase locked on one or the other of the discrete frequencies the phase shifted VCO output is in phase with the discrete frequency being tracked by the phase lock discriminator loop. A phase lock carrier detector included in the circuit arrangement "ANDS" the frequency of the FM logic signal being transmitted to the discriminator loop with the phase shifted VCO output in such a way that pulses are generated when these signals are substantially in phase. The average level of these pulses as a function of time provides a measure of the validity of the FM logic signals, since the phase shifted VCO output when freqnecy locked on one of the discrete frequencies should be substantially in phase with the frequency of the valid FM logic signals being received. Therefore, the carrier detector includes a pulse averaging circuit which operates to time average these pulses and generate an enabling signal whenever the average pulse level exceeds a predetermined level. This enabling signal indicates the presence of valid data and may be "ANDED" with other external generated enabling signals to enable various portions, such as the modulating circuitry, of the data transmission apparatus. Additionally, in an alternate form of the present invention, the carrier detector is enabled by an external signal to generate its output signal representing the presence of valid data.

Thus, there is provided data transmission apparatus of the type adaptable for use as interfacing equipment between telephone lines and data terminals characterized by a novel circuit arrangement for determining the validity of data received in the form of discrete frequencies.

The above and other objects, advantages and features of the present invention will become more readily understood and appreciated from a consideration of the following detailed description of preferred and alternate forms of the present invention when taken together with the accompanying drawings, in which.

Figure 1:
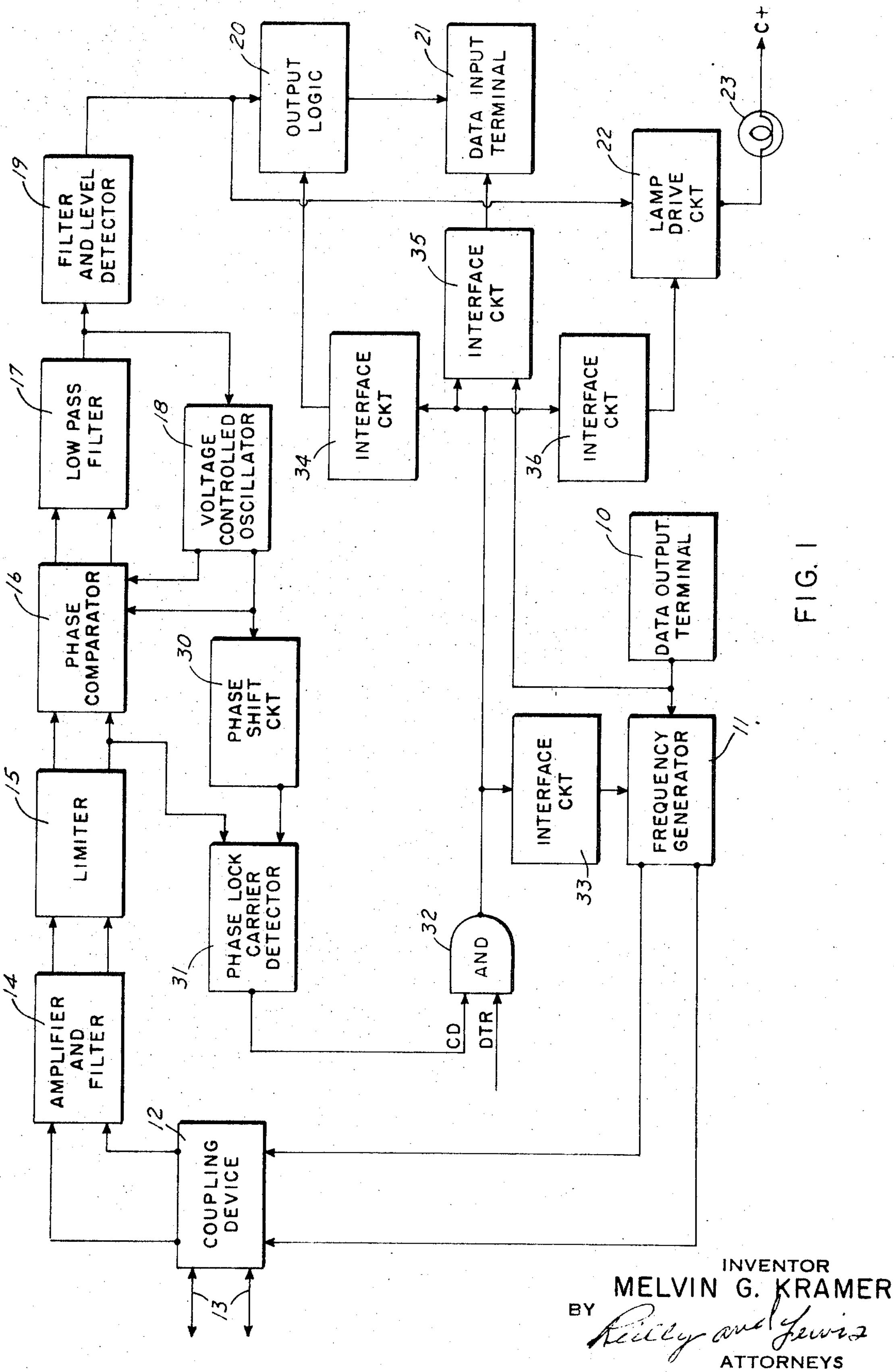
FIG. 1 is a block diagram of a data transmission apparatus having a circuit arrangement according to the present invention for determining the validity of data received by the apparatus.

Referring to the drawings in more detail there is shown in FIG. 1 an exemplary data transmission apparatus having modulating and demodulating circuitry similar to that of the data transmission apparatus disclosed in assignee's U. S. patent application Ser. No. 24,555. The modulating circuitry is formed by a conventional frequency generator 11 and coupling device 12. The frequency generator 11, when enabled, operates to convert voltages representing first and second DC logic signals received from a data output terminal 10 into FM logic signals of first and second discrete frequencies, such as 1,070 and 1,270 herz. The 1,070 and 1,270 herz logic signals which represent, respectively, space and mark are transmitted to transmission lines 13, such as telephone lines, by the coupling device 12. The coupling device 12 may either accoustically or electrically couple the modulating circuit to the transmission lines 13.

The demodulating circuitry in the data transmission apparatus is formed by the coupling device 12, amplifier and filter 14, limiter 15, phase comparator 16, low pass filter 17, controlled oscillator (VCO) 18, filter and level detector 19 and output logic 20. The coupling device 12 transmits FM logic signals received from the transmission lines 13 to the amplifier and filter 14. The amplifier and filter 14 is made up of conventional circuitry including high and low pass filters to form bandpass filter means and operates to amplify and transmit a narrow band of frequencies including the FM logic signals received from the transmission lines 13. The FM logic signals received from the lines 13 are in the form of two discrete frequencies, such as 2,025 and 2,225 herz, which represent, respectively, space and mark. Accordingly, in order to transmit these 2,025 and 2,225 herz data signals to the limiter 15, the amplifier and filter 14 is preferably designed to amplify and transmit a frequency band of 2,000–2,250 herz.

The limiter 15 receives the output of the amplifier and filter 14 and generates bipolar rectangular signals which are linearly transferable by the phase comparator 16. The phase comparator 16 along with the low pass filter 17 and the VCO 18 form a phase lock loop the operation of which is described in detail in the aforementioned U. S. patent application Ser. No. 24,555. The phase lock loop operates as a frequency discriminator comparing the frequency of the 2,025, 225 herz FM logic signals with the frequency of the VCO output at the phase comparator 16 and generating DC logic signals at the output of the low pass filter 17 proportional to the phase difference of the compared signals. Thereby, the 2,025, 2,225 herz logic signals are demodulated and converted into DC logic signals. The demodulated output of the filter 17 also drives the VCO to adjust its frequency so that the VCO frequency locks onto the instant frequency of the received FM logic signals at a 90° phase displacement, thereby generating an electrical signal which corresponds to the single frequency FM logic signal tracked and is 90° out of phase therewith.

The demodulated logic signals on the output of the filter 17 are conditioned by the filter and level detector 19 which operates in a conventional manner to remove noise and limit the voltages of the DC logic signals to standard voltage levels, such as 0 and +5 volts. The conditioned DC logic signals are transmitted to the output 20 which, when enabled, transmits the logic signals to a data input terminal 21. The input terminal 21 reads in these DC logic signals when enabled. The conditioned logic signals from the filter and level detector 19 are also transmitted to a lamp drive circuit 22, which circuit 22 when enabled operates a lamp 23 at the rate data is transmitted to the output logic 20.

In order to detect the validity of data transmitted to the phase comparator 16, a novel circuit arrangement is included in the exemplary data transmission apparatus. This circuit arrangement includes a phase shift circuit 30 and a phase lock carrier detector 31. As before discussed, there is a trait which may be considered characteristic of valid FM logic signals. This trait is that each valid FM logic signal has a single discrete frequency and a predetermined phase difference which is 90° exists between a signal at each of the discrete frequencies and the VCO output frequency when the VCO 18 is phase locked on one of the incoming FM logic signals. The novel circuitry defined by the phase shift circuit 30 and phase lock carrier detector 31 utilizes the characteristic that the frequency of the FMlogic signals from the limiter 15 FM logic be a single frequency and have a 90° phase difference from the VCO output frequency when the VCO 18 is phase locked thereon to determine the validity of data being transmitted to the phase comparator 16.

In operation, the phase shift circuit 30 is designed to shift the output of the VCO 18 by 90° so that the phase shifted output of the VCO 18 is in phase with the received frequency whenever the VCO 18 is frequency locked on one of the valid logic signals 2,025 or 2,225 herz. The phase lock carrier detector 31 "ANDS" the frequency of the received FM logic signal with the frequency locked phase shifted VCO output to generate pulses which are time-averaged. The time-averaged pulses indicate or measure the phase relationship between the VCO output and the frequency of the FM logic signals from the limiter 15, the average pulse level being relatively high whenever the 90° phase shifted and frequency locked VCO output is in phase with the frequency of the received FM logic signals. This average pulse level may be used as a measure of the validity of data transmitted to the phase comparator 16, since the 90° phase relationship between the VCO output and the incoming signal degenerates if the incoming signal is noise or corrupted with noise, and the phase lock carrier detector 31 is designed to generate an enabling signal CD (carrier detect) indicating the presence of valid data whenever the average pulse level exceeds a predetermined minimum level.

It is noted that the important point in this manner of detecting valid data is that the phase lock discriminator loop is capable of tracking a single frequency within its design limits but cannot track noise since noise is not of a single frequency. Further, when the phase lock loop is tracking an incoming single frequency signal, the VCO output frequency is phase locked to the incoming signal at a predetermined phase displacement which in the case of the examplary apparatus here described is 90°. The phase shift circuit 30 appropriately phase shifts the VCO output the amount of the predetermined phase displacement, i.e. 90°, so that the phase lock carrier detector 31 ANDS signals which are substantially in phase so as to generate a maximum output. It is noted that if the incoming signal received by the phase comparator 16 is corrupted by noise or is noise that the VCO 18 will not be able to track the incoming signal so that the 90° phase relationship between the incoming signal and the VCO output will degenerate with the result that the output of the phase lock carrier detector 31 decreases. The output of the detector 31 is therefore an indication or measure of the quality of the signal being received by the phase comparator 16 and the determination of valid data is based upon the quality of this received signal. Obviously, with no input signal to the comparator 16 or only with noise, no output will be generated by the phase lock carrier detector 31.

The enabling signal CD is "ANDED" by AND gate 32 with an externally generated signal DTR. The signal DTR (data terminal ready) indicates that the data terminal made up of the output terminal 10 and input terminal 21 is ready to operate. The AND gate 32 generates an output when the signals CD and DTR are simultaneously received. The output of the gate 32 is conditioned, respectively, by conventional interface circuits 33, 34, 35 and 36 to enable the frequency generator 11, output logic 20, data input terminal 21 and lamp drive circuit 22, thereby to enable the exemplary data transmission apparatus.

Thus, an exemplary data transmission apparatus has been described wherein the validity of received data of first and second discrete frequencies is determined as a function of the singleness of the frequency of each data signal and the ability of a phase lock discriminator loop to track the received data. An enabling signal CD representing valid data is generated whenever the frequency of one of the discrete frequencies is tracked by a phase locked voltage controlled oscillator (VCO). The enabling signal CD is "ANDED" with an externally generated signal DTR indicating that the data terminal is ready to provide pulses for enabling various portions of the data transmission apparatus. It is noted that the enabling signal CD may, if properly conditioned, be used alone to enable the various portions of the data transmission apparatus or could be "ANDED" with other external signals in addition to the DTR signal to generate appropriate signals for enabling the data transmission apparatus.

Figures 2, 3:
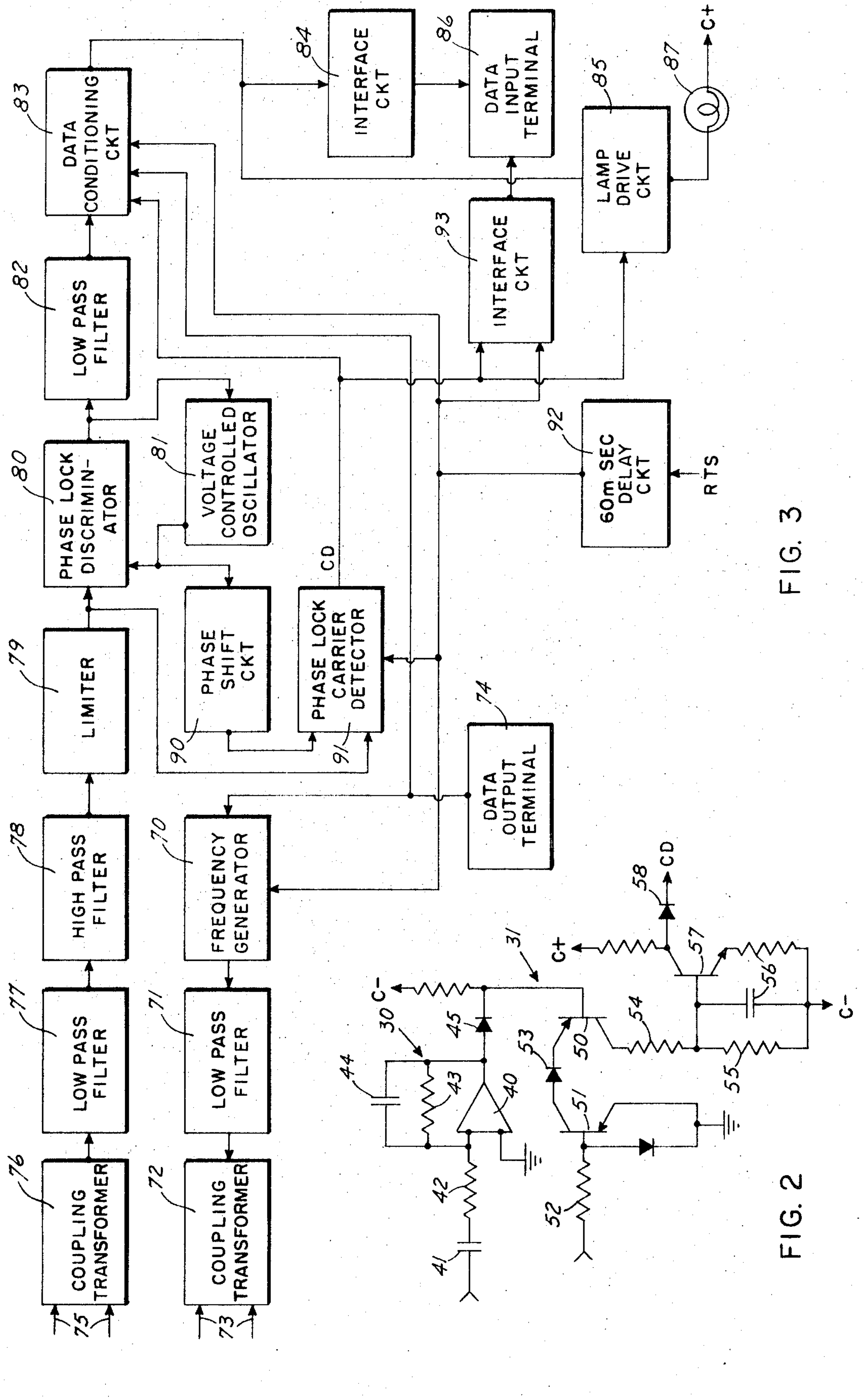
FIG. 2 is a circuit diagram illustrating the phase shift circuit and the phase lock carrier detector of FIG. 1.
FIG. 3 is a block diagram of another data transmission apparatus having an alternate form of circuit arrangement according to the present invention for determining the validity of data received by the apparatus.

There is shown in FIG. 2 a preferred form of phase shift circuit 30 and phase lock carrier detector 31 for use in the exemplary data transmission apparatus of FIG. 1. The phase shift circuit 30 includes an operational amplifier 40 with two inputs. One input of the amplifier 40 is grounded while its other input receives the output of the VCO 18 through a DC blocking capacitor 41 connected in series with a resistor 42. Connected between the output of the amplifier 40 and its input receiving the VCO output are a parallel connected resistor 43 and capacitor 44. The amplifier 40 in conjunction with the resistor 43 and capacitor 44 form a conventional phase shift circuit to phase shift the VCO output a predetermined amount which is equal to the phase displacement between the discrete frequency being tracked by the VCO 18 and the VCO output. Since the examplary data transmission apparatus of FIG. 1 is designed to receive valid data at the discrete frequencies of 2,025, 2,225 herz and the phase difference between these discrete frequencies and the phase locked VCO output when one of these discrete frequencies is being tracked is 90°, the values of the resistor 43 and capacitor 44 are appropriately selected in the phase shift circuit 31 to provide the correct amount of delay to shift the VCO output 90° in phase. The phase shifted VCO output is transmitted through a diode 45 to the phase lock carrier detector 31.

The carrier detector 31 includes PNP transistors 50 and 51 which are appropriately biased and connected to "AND" the 90° phase shifted VCO with the frequency of the FM logic signals transmitted by the limiter 15. The phase shifted VCO output from the phase shift circuit 30 is applied to the base of the transistor 50 and the output of the limiter 15 is applied through a resistor 52 to the base of the transistor 51. The transistor 51 functions to generate an electrical signal thereacross which is representative of the instanteous frequency of the output of the limiter 15. The transistors 50 and 51 have their emitter-collector electrode paths series connected with the emitter electrode of transistor 51 connected through diode 53 to the collector electrode of the transistor 50.

In operation of the preferred form of carrier detector 31 shown in FIG. 2, the frequency of the FM logic signals and the phase shifted VCO output are "ANDED" together by the transistors 50, 51 which conduct and generate pulses across the resistor 54 on the collector electrode of the transistor 50 whenever the signals on the bases of the transistors 50 and 51 are substantially in phase. As before discussed, the phase shifted VCO output should be in phase with the frequency of signals transmitted by the limiter 15 only when the VCO output is frequency locked on a valid data signal represented by a 2,025 or 2,225 herz signal. Thus, these pulses generated on the resistor 54 provide a measure of the phase relationship between the frequency of the FM logic signals transmitted by the limiter 15 and the frequency locked VCO output so that a time average of the pulse level provides a reliable indication of the validity of the data being transmitted to the phase comparator 16.

A pulse averaging circuit made up of a parallel connected resistor 55 and capacitor 56 averages the pulses generated across the resistor 54 and drives an appropriately biased NPN transistor 57 to generate the enabling signal CD on the collector electrode of the transistor 57 whenever the average pulse level measured exceeds a predetermined minimum level so as to indicate the presence of valid data. The enabling signal CD is transmitted through an appropriately connected diode 58 to the AND gate 32 shown in FIG. 1. It is noted that C+ and C− bias voltages are used for biasing the transistors 50, 51 and 57.

There is shown in FIG. 3 another exemplary data transmission apparatus having modulating and demodulating circuitry similar in construction and operation to the data transmission apparatus disclosed in assignee's U. S. patent application Ser. No. 24,555. The modulating circuitry is formed by a frequency generator 70 and a low pass filter 71 and is coupled by a conventional coupling transformer 72 to a pair of transmission lines 73. The modulating circuitry, when enabled, operates to convert voltages representing first and second DC logic signals received from a data output terminal 74 into FM logic signals of first and second discrete frequencies in a manner similar to the modulating circuitry of the apparatus of FIG. 1.

The demodulating circuitry of the exemplary apparatus of FIG. 3 is coupled to transmission lines 75 by a coupling transformer 76 to receive FM logic signals of first and second discrete frequencies therefrom. The demodulating circuitry is formed by a low pass filter 77, a high pass filter 78, a limiter 79, a phase lock discriminator 80, a voltage controlled oscillator (VCO) 81, another low pass filter 82, a data conditioning circuit 83 and an interface circuit 84. The demodulating circuit functions in substantially the same manner as the demodulating circuit of the apparatus of FIG. 1 with the filters 77, 78 limiting the band of frequencies supplied to the limiter 78, the limiter 79 generating signals linearly transferable by the phase lock discriminator 80, and the discriminator 80 and VCO 81 forming a phase lock loop which demodulates the FM logic signals of discrete frequencies in the same manner as the phase lock loop in the apparatus of FIG. 1. The DC logic signals produced by the phase lock loop are conditioned by the low pass filter 82 and data conditioning circuit 83 and, whenever the circuit 83 is enabled, are transmitted to a lamp drive circuit 85 and through the interface circuit 84 to the data input terminal 86. The terminal 86 when enabled reads in the DC logic signals from the conventional interface circuit 84 and the lamp drive circuit 85 when enabled operates the lamp 87 which is biased by C+ voltage to indicate the transfer of data to the data input terminal 86.

In order to detect the validity of data transmitted to the phase lock discriminator 80, a phase shift circuit 90 and phase lock carrier detector 91 are connected in the same manner as in FIG. 1. The circuit 90 and carrier detector 91 function in the same manner as the identically named components in FIG. 1 except that the carrier detector 91 must be enabled before it can generate the enabling signal CD to indicate the presence of valid data.

In the apparatus of FIG. 3, the signal which enables the frequency generator 70 and carrier detector 91 is generated by applying an externally generated logic signal RTS to a conventional 60 m sec delay circuit 92. The signal RTS indicates that the data terminals 74 and 86 are ready. The output of the circuit 92 along the the signal CD are supplied to a conventional interface circuit 93 to enable the data input terminal 86. The data conditioning circuit 83 is enabled by the combination of the DC logic signals outputted from the terminal 74, the output of delay circuit 92 and the enabling signal CD. The enabling signal CD is also supplied to the lamp drive circuit 85 to enable that circuit. Thus, another exemplary data transmission apparatus has been described which incorporates circuitry according to the present invention for determining the validity of data which circuitry must itself be enabled before it generates the enabling signal CD to indicate the presence of valid data. This latter described data transmission apparatus has been found particularly suitable for transmitting and receiving logic signals on transmission lines of relatively limited distance.

Thus, there has been provided data transmission apparatus adaptable for use as interfacing equipment between telephone lines and data terminals which has a novel circuit arrangement for determining the validity of data received in the form of discrete frequencies by the apparatus. The novel circuitry is characterized by measuring the validity of the data as a function of the singleness of the frequencies of the received data and of the phase relationship between the frequencies of the logic signals and a phase locked VCO output frequency.

It is therefore to be understood from the foregoing description of preferred and alternate forms of the present invention that various modifications and changes may be made in the specific design, construction and arrangement of parts without departing from the spirit and scope of the present invention as defined by the appended claims and reasonable equivalents thereof.

What is claimed is:

1. In a data transmission apparatus wherein binary data in the form of electrical signals at two discrete frequency levels representing the binary data are received and converted into DC logic signals by a phase lock discriminator loop which includes a voltage controlled oscillator driven by the output of the phase lock discriminator loop to phase lock onto the electrical signals at the two discrete frequency levels received by the discriminator loop with a predetermined phase displacement, the improvement comprising:

phase shifting means connected to receive the output of said voltage controlled oscillator, said phase shifting means being operable to phase shift the received output signal of said oscillator a predetermined amount substantially equal to the predetermined phase displacement between electrical signals at said discrete frequency levels and the electrical output signal of said phase locked voltage controlled oscillator;

AND means connected to sense the electrical signals received by said discriminator loop and connected to receive the phase shifted output signal of said oscillator, said circuit means being operable to AND said electrical signals sensed with the phase shifted output signal of said oscillator whereby to generate a pulsed output which is a measure of the validity of data received by said discriminator loop; and pulse averaging means connected to said circuit means to receive said pulsed output, said pulse averaging means being operable to average said pulsed output as a function of time and generate an enabling signal which indicates the presence of valid data whenever the average of said pulsed output exceeds a predetermined minimum level.

2. The invention recited in claim 1, including means for enabling said data transmission apparatus, said enabling means being responsive to said enabling signal generated by said pulse averaging means whereby to only enable said data transmission apparatus whenever said pulse averaging means generates said enabling signal.

3. The invention recited in claim 1, including first means for selectively enabling said pulse averaging means whereby said pulse averaging means is only operable to generate said enabling signal whenever enabled by said first enabling means.

4. The invention recited in claim 3, including second means for enabling said data transmission apparatus, said second enabling means being responsive to said enabling signal generated by said pulse averaging means whereby to only enable said data transmission apparatus whenever said pulse averaging means generates said enabling signal.

5. The invention recited in claim 4, wherein said AND means includes a pair of transistors having their emitter-collector electrode paths connected in series so that electrical signals applied to the bases of said transistors are ANDED thereby, the base of one of said transistors being connected to sense the electrical signals received by said discriminator loop and the base of the other of said transistors being connected to receive the phase shifted output signal of said oscillator.

6. The invention recited in claim 1, wherein said AND means includes a pair of transistors having their emitter-collector electrode paths connected in series so that electrical signals applied to the bases of said transistors are ANDED thereby, the base of one of said transistors being connected to sense the electrical signals received by said discriminator loop and the base of the other of said transistors being connected to receive the phase shifted output signal of said oscillator.

7. The invention recited in claim 1, including a bandpass filter means in said data transmission apparatus for filtering received electrical signals and transmitting the filtered signals to said discriminator loop, said bandpass filter means being operable to transmit electrical signals at said first and second discrete frequencies.

8. Apparatus for determining the validity of binary data received by a data transmission apparatus where valid binary data is characterized by electrical signals at two discrete frequency levels representing the binary data, said apparatus comprising:

means for generating a first electrical signal which corresponds in frequency to the discrete frequency of received data and is phased displaced a predetermined amount therefrom;

means for phase shifting said first electrical signal a predetermined amount substantially equal to the predetermined phase displacement between the discrete frequency of said received data and said first electrical signal;

AND means for ANDING said phase shifted first electrical signal with said received data signal whereby to produce a pulsed output signal which is a measure of the validity of received data, said AND means including a pair of transistors having their emitter-collector electrode paths connected in series to AND together said phase shifted first electrical signal with said received data signal to generate said output signal; and a pulse averaging circuit for averaging said pulsed output as a function of time and generating an enabling signal which indicates the presence of valid data whenever the average of said pulsed output exceeds a predetermined minimum level.

* * * * *